United States Patent [19]

Taniyasu et al.

[11] 4,122,126

[45] Oct. 24, 1978

[54] METHOD FOR REMOVING ALUMINUM HALIDE CATALYST FROM POLYMERIZATION PRODUCT

[75] Inventors: Ryozo Taniyasu, Yokohama; Hideo Kurokawa, Kawasaki; Takeshi Saito, Chiba, all of Japan

[73] Assignee: The Lion Fat and Oil Co. Ltd., Tokyo, Japan

[21] Appl. No.: 793,548

[22] Filed: May 4, 1977

[30] Foreign Application Priority Data

May 7, 1976 [JP] Japan ................................ 51-51369

[51] Int. Cl.² ............................................... C07C 7/00
[52] U.S. Cl. .................................. 260/677 A; 208/13; 260/676 R; 260/683.15 B
[58] Field of Search ..... 208/13; 260/676 R, 683.15 B, 260/677 A

[56] References Cited

U.S. PATENT DOCUMENTS

| | | | |
|---|---|---|---|
| 3,342,885 | 9/1967 | Hutson | 208/13 |
| 3,810,951 | 5/1974 | Riordan et al. | 260/677 A |

FOREIGN PATENT DOCUMENTS

| | | |
|---|---|---|
| 49-32314 | 8/1974 | Japan. |
| 1,043,565 | 9/1966 | United Kingdom. |

OTHER PUBLICATIONS

Chem. Abs. 75, 144424 (1971).

*Primary Examiner*—C. Davis
*Attorney, Agent, or Firm*—Armstrong, Nikaido, Marmelstein & Kubovcik

[57] ABSTRACT

Disclosed is a method for removing an aluminum halide or its complex catalyst from a polymerization product comprising the steps of adding to the polymerization product an aprotic polar solvent in an amount of 1.0 through 6.0 mol per one mol of the aluminum halide in the catalyst present in the product and sufficiently mixing them at a temperature of 70° through 150° C, and then, filtering the mixture at a temperature of 70° through 150° C. The addition of the aprotic polar solvent remarkably facilitates the separation of the catalyst from the polymerization product.

4 Claims, No Drawings

METHOD FOR REMOVING ALUMINUM HALIDE CATALYST FROM POLYMERIZATION PRODUCT

The present invention relates to a method for removing an aluminum halide or its complex catalyst from a polymerization product prepared by employing said catalyst. More particularly, it relates to a method for removing the catalyst component from an olefin polymerization product obtained in the presence of said catalyst.

In the case where olefins are polymerized by employing aluminum halide or its complex as a catalyst, the catalyst is generally left in the polymerization product. Therefore, if the olefin polymers are used for base oils for lubricating oils, raw materials for cosmetic preparations and the like, the following treatment is needed. That is, the catalyst is first removed from the polymerization product, and an unreacted olefin monomer and an olefin dimer are removed by distillation, and then, the olefin polymer thus obtained in hydrogenated to improve the heat stability and oxidative stability of the polymer. In such additional treatment, the first catalyst removal step is very important. For instance, when the catalyst removal is not sufficient, undesirable problems occur. That is, the olefin polymer is discolored; the quality or property of the polymer decreases due to the structure change of the polymer during the subsequent distillation step; hydrogen halide gas is undesirably generated due to the thermal degradation of the catalyst, or; the hydrogenation catalyst is poisoned, during the hydrogenation step, by halogen which are contained in the polymer as a contaminant. For this reason, in the additional treatment of the polymerization product of olefins, it is preferable to first sufficiently remove the catalyst from the polymerization product so as not to contaminate the polymers with halogen.

Various physical methods for the removal of catalysts, such as, for example, sedimentation methods and adsorption methods, are known. However, since aluminum halides or their complex compounds are present in the polymerization products in a state near dissolution, it is very difficult to remove catalysts completely from the polymerization products with the conventional physical methods. Under these circumstances, a method for the removal of catalysts which are deactivated after the completion of the polymerization has been heretofore proposed and generally adopted. This method comprises the steps of transforming the catalysts present in the polymerization products to inactive complexes or decomposing the catalysts by the addition to the polymerization products of agents, such as, for example, gaseous ammonia, aqueous ammonia, an aqueous caustic solution, an aqueous inorganic acid solution, alkaline salts of inorganic acid in water solution, alcohols, ketones, aldehydes, ethers, carboxylic acids or water, and; then, removing the resultant inactive or decomposed catalysts from the polymerization products. However, this method still has the defects set forth below and a satisfactory result in the removal of the catalysts cannot be obtained.

In the case where, for instance, an aluminum chloride catalyst is employed in the polymerization, the problem of forming aluminum hydroxide, which is very difficult to remove, occurs when the polymerization product is treated with an aqueous caustic solution or water. Alternatively, when an acid solution is employed, not only the apparatus and instruments are readily corroded, but also the acid cannot be removed by mere water-washing due to a chemical action of the acid to the polymer, and also, the quality or properties of the polymer decreases because the contamination of chlorine in the polymer cannot be completely prevented. Furthermore, when gaseous ammonia is employed, since a complex of aluminum chloride and ammonia forms, which is very difficult to filter off, it is very difficult to remove the complex from the polymerization products by filtration, and; further, ammonia dissolved in the product is evolved during the distillation step of the additional treatment.

Accordingly, the objects of the present invention are to obviate the afore-mentioned problems of the conventional methods for the removal of an aluminum halide or its complex catalyst from a polymerization product and to provide an improved method for the removal of the catalyst which is capable of deactivating the catalyst remaining in the polymerization product into a form easy to filter off.

Other objects and advantages of the present invention will become clear from the following description.

In accordance with the present invention, there is provided a method for removing an aluminum halide or its complex catalyst from a polymerization product prepared by employing said catalyst comprising the steps of:

(a) adding to the polymerization product an aprotic polar solvent in an amount of 1.0 through 6.0 mol based upon one mol of the aluminum halide in the catalyst present in the polymerization product;

(b) sufficiently mixing the polymerization product and the solvent at a temperature within the range from 70° to 150° C., and;

(c) then, filtering the mixture at a temperature within said range.

The aprotic polar solvent employed in the present invention includes, for example, N,N-dimethylformamide, N,N-dimethylacetoamide, N,N-dimethyl propionamide, dimethyl sulfoxide, methylethyl sulfoxide and hexamethylphosphor triamide. Among these exemplified solvents N,N-dimethylformamide and dimethyl sulfoxide are most preferable.

These aprotic polar solvents are employed in an amount of 1.0 through 6.0 mol based upon one mol of the aluminum halide or the aluminum halide in its complex catalyst present in the polymerization product to be treated. When the amount of the polar solvent is less than 1.0 mol/mol of the aluminum halide, all of the catalyst present in the polymerization product cannot be converted into a complex which is capable of being filtered off. On the other hand, when the amount of the polar solvent is more than 6.0 mol/mol of the aluminum halide, the excess aprotic polar solvent is unpreferably left in the polymerization product after filteration. This is due to the fact that the aprotic polar solvents form a complex easy to filter off, with aluminum halide in only a molar ratio of not more than 6.0 (i.e. solvent/aluminum halide). The excess aprotic polar solvent to be added to the polymerization product can be simultaneously distilled off when the unreacted monomer and the dimer are distilled off from the polymerization product after filtration. However, if the unreacted monomer and the dimer thus recovered are employed in the subsequent polymerization reaction, the aprotic polar solvent undesirably decreases the activity of the polymerization catalyst.

In addition, when the aprotic polar solvent is added to the polymerization product, the aprotic polar solvent may be added after the removal of the portions of the catalyst if the portions of the catalyst can be removed by, for example, a sedimentation separation process.

The treatment of the polymerization products with the aprotic polar solvent and the filtration can be advantageously carried out within the range from approximately 70° to approximately 150° C. When the temperature is below 70° C., the complex formed by the interaction of the catalyst and the aprotic polar solvent cannot be completely removed from the polymerization product since the complex is not stable. Contrary to this, when the temperature is above 150° C., the resultant complex also cannot be completely removed from the polymerization products since the complex melts at a temperature of approximately 150° C. or more. Accordingly, the method according to the present invention is preferably carried out at a temperature within the range from 80° to 120° C. for at a least one hour.

Any conventional methods, known per se, may be used for the filtration of the polymerization product containing the complex formed by the interaction of the catalyst and the aprotic polar solvent. Such methods include, for example, the filtration using the leaf filter. The filtration is usually completed at a temperature of 80° through 120° C.

The catalyst to which the removal method of the present invention can be applied includes aluminum halide such as aluminum chloride, aluminum bromide or the like and the complex of the aluminum halide, with ketone such as methyl ethyl ketone, methyl butyl ketone or the like; ether such as ethylene glycol dimethyl ether, diethyl ether or the like; fatty ester such as ethyl acetate, methyl propionate or the like; or polyol derivatives such as propoxy ethyl acetate, butoxy ethyl acetate or the like. These catalysts are well known as polymerization catalysts suitable for use in the polymerization of olefin monomers such as, for example, hexene-1, octene-1, decene-1, 2-ethyloctene-1, tridecene-1, octadecene-1 and the like.

As is apparent from the above description, according to the present invention, aluminum halide or its complex contained in the polymerization product can be converted into a complex which is capable of being easily filtered off and, therefore, substantially all aluminum halide or its complex can be removed from the polymerization product by means of simple filtration.

The present invention is further illustrated, but by no means limited to, the following examples together with the comparative examples.

EXAMPLE 1

15 g of aluminum chloride was charged into 1 liter of a glass autoclave provided with an agitator and then, 600 g of ocetene-1 was dropwise added and the mixture was polymerized at a temperature of 60° C. for 3 hours. After the completion of the polymerization, into the polymerization product so obtained, an aprotic polar solvent shown in Table 1 below was added and stirred for one hour at a temperature of 90° C. The mixture of the polymerization product and the aprotic polar solvent was then filtered and the chloride content of the polymerization product was determined. The aprotic polar solvents used, the amount thereof, mol ratio thereof to the aluminum chloride present in the polymerization product and the chloride content of the polymerization product thus obtained are shown in Table 1.

Table 1

| Aprotic Polar Solvent | Amount of Use (g) | Mol Ratio | Chlorine Content (ppm) |
|---|---|---|---|
| Dimethylformamide | 7.0 | 0.85 | 268 |
| " | 8.2 | 1.00 | 12 |
| " | 10.0 | 1.22 | 13 |
| " | 20.0 | 2.43 | 12 |
| " | 30.0 | 3.64 | 11 |
| " | 40.0 | 4.83 | 14 |
| N,N-dimethylacetoamide | 20.0 | 2.04 | 14 |
| " | 30.0 | 3.07 | 15 |
| Dimethyl sulfoxide | 15.0 | 1.71 | 15 |
| " | 20.0 | 2.28 | 11 |

EXAMPLE 2

A polymerization product of octene-1 was prepared in the same manner as in Example 1. Into the polymerization product 2.0 mol of dimethylformamide based upon one mol of aluminum chloride present in the polymerization product was added and the mixture was stirred for one hour at a temperature listed in Table 2. Then, the mixture of the polymerization and the aprotic polar solvent was filtered, and the chlorine content of the polymerization was determined. The agitation temperature and the results of the chlorine contents are shown in Table 2 below.

Table 2

| Agitation Temperature (° C) | Chlorine Content (ppm) |
|---|---|
| 50 | 93 |
| 80 | 12 |
| 120 | 13 |
| 150 | 65 |

EXAMPLE 3

7.0 g of ethoxyethylacetate and 14.1 g of aluminum chloride (one functional group forming a complex per one molecular of aluminum chloride) were added into 1 liter of a glass autoclave and, after heating to a temperature of 100° C., 600 g of octene-1 was dropwise added and polymerized for five hours. Then the polymerization product thus obtained was treated in the same manner as in Example 2. The agitation temperature after the addition of dimethylformamide and the results of the chlorine contents of the polymerization products are shown in Table 3.

Table 3

| Agitation Temperature (° C) | Chlorine Content (ppm) |
|---|---|
| 50 | 104 |
| 80 | 14 |
| 100 | 13 |
| 150 | 88 |

Similar results are obtained when polymerization products prepared by polymerizing olefin monomers in the presence of complex catalysts of aluminum halide with ketone such as methyl ethyl ketone, methyl butyl ketone or the like; ether such as ethylene glycol dimethyl ether, diethyl ether or the like; fatty ester such as ethyl acetate, methyl propionate or the like; polyol derivatives such as propoxy ethyl acetate, butoxy ethyl acetate or the like.

Comparative Example 1

A polymerization product of octene-1 was prepared in the same manner as in Example 1. Into the polymerization product an aqueous caustic solution containing 5.0 mol of alkali compound per 1.0 mol of the aluminum chloride present in the product was added and stirred at a temperature of 70° C. for 1 hour. The mixture of the polymerization product and the aqueous caustic solution was then filtered. The chlorine content of the polymerization product thus separated was determined. The results are shown in Table 4 below.

Table 4

| Caustic Solution Used (g) | Chlorine Content (ppm) |
| --- | --- |
| 30% caustic soda 70g | 164 |
| 30% calcium hydroxide 139g | 197 |

Comparative Example 2

A polymerization product of octene-1 was prepared in the same manner as in Example 1. Into the polymerization product an organic compound, shown in Table 5 below, was added in an amount of 2.0 mol based upon 1.0 mol of the aluminum chloride present in the product, and this was stirred at a temperature of 70° C. for one hour. The mixture of the polymerization product and the organic compound was filtered. The chloride content of the polymerization product thus obtained was determined. The results are shown in Table 5 below.

Table 5

| Organic Compound Used | (g) | Chlorine Content (ppm) |
| --- | --- | --- |
| Diethyl ether | 16.6g | 390 |
| Ethyl alcohol | 10.3g | 183 |
| Acetone | 13.0g | 205 |
| Butylaldehyde | 13.9g | 281 |

Table 5-continued

| Organic Compound Used | (g) | Chlorine Content (ppm) |
| --- | --- | --- |
| Propionic acid | 16.6g | 165 |
| Formaldehyde | 10.1g | 340 |

What we claim is:

1. A method for removing an aluminum halide or its complex catalyst from a polymerization product prepared by employing said catalyst comprising the steps of:
   (a) adding to the polymerization product an aprotic polar solvent in an amount of 1.0 through 6.0 mols based upon one mol of the aluminum halide in the catalyst present in the polymerization product;
   (b) sufficiently mixing the polymerization product and the solvent at a temperature within the range of from 70° to 120° C., and
   (c) then, filtering the mixture at a temperature within said range.
2. The method as claimed in claim 1, wherein said aprotic polar solvent is at least one solvent selected from the group consisting of N,N-dimethylformamide, N,N-dimethylacetomide, N,N-dimethyl propionamide, dimethyl sulfoxide, methylethyl sulfoxide and hexamethylphosphor triamide.
3. The method as claimed in claim 1, wherein said aprotic polar solvent and said polymerization product are mixed together at a temperature within the range from 80° to 120° C. for at least one hour and the mixture is filtered at a temperature within said range.
4. The method as claimed in claim 1, wherein said polymerization product is an olefin polymerization product obtained by polymerizing an olefin monomer in the presence of said aluminum halide or its complex catalyst.

* * * * *